(12) United States Patent
Obayashi et al.

(10) Patent No.: US 8,510,210 B1
(45) Date of Patent: Aug. 13, 2013

(54) METHODS AND SYSTEMS FOR CREATING AN INTEREST RATE SWAP VOLATILITY INDEX AND TRADING DERIVATIVE PRODUCTS BASED THEREON

(75) Inventors: Yoshiki Obayashi, New York, NY (US); Antonio Mele, Cimo (CH)

(73) Assignee: Chicago Board Options Exchange, Incorporated, Chicago, IL (US)

( * ) Notice: Subject to any disclaimer, the term of this patent is extended or adjusted under 35 U.S.C. 154(b) by 0 days.

(21) Appl. No.: 13/528,150

(22) Filed: Jun. 20, 2012

Related U.S. Application Data (60) Provisional application No. 61/499,077, filed on Jun. 20, 2011, provisional application No. 61/577,270, filed on Dec. 19, 2011.

(51) Int. Cl.
*G06Q 40/00* (2012.01)

(52) U.S. Cl.
USPC .......................................... 705/37; 705/36 R (58) Field of Classification Search
USPC ............................................................ 705/37
See application file for complete search history.

(56) References Cited

U.S. PATENT DOCUMENTS 7,620,578 B1 * 11/2009 Belton et al. ..................... 705/35
2010/0257118 A1   10/2010 Speth et al.

OTHER PUBLICATIONS

Trolle, An Empirical Analysis of the Swaption Cube, Nov. 2010, UCLA Anderson School of Managment.*
Claes, Anouk G.P., et al., Constructing the US interest rate volatility index, dated Mar. 2010 (31 pages).
DVX Index Guide, Deutsche Bank, Global Markets Research, dated Jan. 26, 2007 (11 pages).
DVXEUR and DGXEUR Indices, DBIQ Index Guide, Deutsche Bank, Global Markets Research, dated Oct. 9, 2007 (10 pages).
López, Raquel et al., Constructing interest rate volatility indices over short- and long-term horizons, Universidad De Castilla-La Mancha, dated May 23, 2011 (52 pages).
Martin, Ian, Simple Variance Swaps, dated Nov. 2001 (38 pages).
Trolle, Anders B. et al., An Empirical Analysis of the Swaption Cube, dated Nov. 2010 (52 pages).
VOX and BPX Index Guide, Barclays Capital, dated Jun. 12, 2008 (11 pages).

* cited by examiner

*Primary Examiner* — Lindsay M Maguire
*Assistant Examiner* — Cho Kwong
(74) *Attorney, Agent, or Firm* — Brinks Hofer Gilson & Lione (57) ABSTRACT

Systems and methods for creating and disseminating an interest rate swap volatility index based on an underlying interest rate swaption, and for creating and trading derivative investment products based on the interest rate swap volatility index, are disclosed. In one aspect, an interest rate swap volatility index based on an underlying interest rate swaption is calculated. The interest rate swap volatility index may be accessed by a processor of a trading platform and a standardized, exchange traded derivative may be created based on the calculated interest rate swap volatility index. Information associated with the interest rate swap volatility index derivative may then be transmitted for display.

12 Claims, 5 Drawing Sheets

METHODS AND SYSTEMS FOR CREATING AN INTEREST RATE SWAP VOLATILITY INDEX AND TRADING DERIVATIVE PRODUCTS BASED THEREON

CROSS-REFERENCE TO RELATED APPLICATIONS

This application claims the benefit of U.S. application Ser. No. 61/499,077, filed Jun. 20, 2011, and claims the benefit of U.S. application Ser. No. 61/577,270, filed Dec. 19, 2011, and the entirety of each of these aforementioned applications is hereby incorporated herein by reference.

FIELD OF THE DISCLOSURE

The present disclosure relates to derivative investment markets. More specifically, the present disclosure relates to electronically creating and disseminating one or more volatility indices calculated using interest rate swaption (i.e., is an option granting its owner the right but not the obligation to enter into an underlying interest rate swap) data, and facilitating the electronic creation and trading of derivative products based on one or more indices relating to volatility. Additionally, the present disclosure relates to electronically creating and disseminating one or more indices relating to interest rate swap volatility, and facilitating the electronic creation and trading of derivative products based on the one or more indices relating to interest rate swap volatility.

BACKGROUND

A derivative is a financial instrument whose value depends at least in part on the value and/or characteristic(s) of another security, known as an underlying asset. Examples of underlying assets include, but are not limited to: interest rate financial instruments (e.g., bonds, interest rate swaps, and interest rate swaptions), commodities, securities, electronically traded funds, and indices. Two exemplary and well known derivatives are options and futures contracts.

Figure 1:
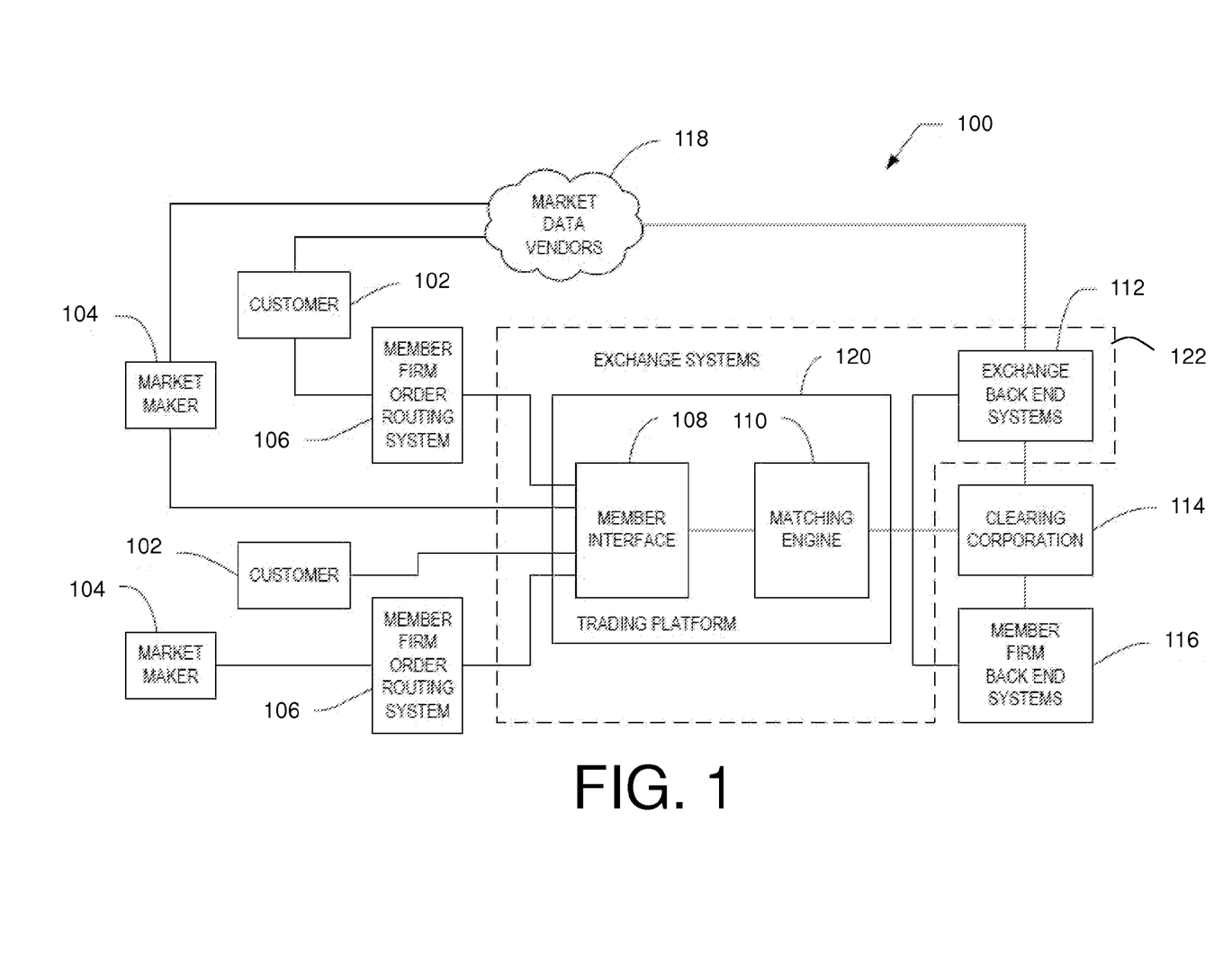
FIG. 1 is a diagram of a financial exchange's computerized trading system.

Derivatives, such as options and futures contracts, may be traded over-the-counter and/or on other trading platforms, such as organized exchanges (e.g., the Chicago Board Options Exchange, Incorporated ("CBOE")). In over-the-counter transactions the individual parties to a transaction are able to customize each transaction to meet each party's individual needs. With trading platform or exchange traded derivatives, buy and sell orders for standardized derivative contracts are submitted to an exchange where they are matched and executed. Generally, modern trading exchanges have exchange specific computer systems that allow for the electronic submission of orders via electronic communication networks, such as the Internet. An example of an exchange specific computer system is illustrated in FIG. 1.

Once matched and executed, the executed trade is transmitted to a clearing corporation that stands between the holders and writers of derivative contracts. When exchange traded derivatives are exercised, the cash or underlying assets are delivered, when necessary, to the clearing corporation and the clearing corporation disperses the assets as appropriate and defined by the consequence(s) of the trades.

An option contract gives the contract holder a right, but not an obligation, to buy or sell an underlying asset at a specific price on or before a certain date, depending on the option style (e.g., American or European). Conversely, an option contract obligates the seller of the contract to deliver an underlying asset at a specific price on or before a certain date, depending on the option style (e.g., American or European). An American style option may be exercised at any time prior to its expiration. A European style option may be exercised only at its expiration, i.e., at a single pre-defined point in time.

There are generally two types of options: calls and puts. A call option conveys to the holder a right to purchase an underlying asset at a specific price (i.e., the strike price), and obligates the writer to deliver the underlying asset to the holder at the strike price. A put option conveys to the holder a right to sell an underlying asset at a specific price (i.e., the strike price), and obligates the writer to purchase the underlying asset at the strike price.

There are generally two types of settlement processes: physical settlement and cash settlement. During physical settlement, funds are transferred from one party to another in exchange for the delivery of the underlying asset. During cash settlement, funds are delivered from one party to another according to a calculation that incorporates data concerning the underlying asset.

A futures contract gives a buyer of the future an obligation to receive delivery of an underlying commodity or asset on a fixed date in the future. Accordingly, a seller of the future contract has the obligation to deliver the commodity or asset on the specified date for a given price. Futures may be settled using physical or cash settlement. Both options and futures contracts may be based on abstract market indicators, such as indices.

An index is a statistical composite that is used to indicate the performance of a market or a market sector over various time periods, i.e., act as a performance benchmark. Examples of indices include the Dow Jones Industrial Average, the National Association of Securities Dealers Automated Quotations ("NASDAQ") Composite Index, and the Standard & Poor's 500 ("S&P 500"). As noted above, options on indices are generally cash settled. For example, using cash settlement, a holder of an index call option receives the right to purchase not the index itself, but rather a cash amount equal to the value of the index multiplied by a multiplier, e.g., $100. Thus, if a holder of an index call option exercises the option, the writer of the option must pay the holder, provided the option is in-the-money, the difference between the current value of the underlying index and the strike price multiplied by a multiplier.

Among the indices that derivatives may be based on are those that gauge the volatility of a market or a market subsection. For example, CBOE created and disseminates the CBOE Market Volatility Index or VIX®, which is a key measure of market expectations of near-term volatility conveyed by S&P 500 stock index options prices. Additionally, CBOE offers exchange traded derivative products (both futures and options) that use the VIX as the underlying asset. Volatility indices and the derivative products based thereon have been widely accepted by the financial industry as both a useful tool to hedge positions and as a device for expressing investment views on the direction of volatility.

While several volatility indices exist, there currently exists no implementation of a volatility gauge for interest rate swap markets that is theoretically consistent with prices prevailing in existing swaption markets. Particularly, no standardized benchmarks exist to estimate the volatility in the interest rate swap ("IRS") markets over a given investment horizon. Because no standardized benchmark currently exists that reflects expected IRS market volatility, traders, other market participants, and/or money managers currently trade interest rate swaptions (i.e., options on interest rate swaps) to hedge other financial positions, facilitate market-making, and/or take particular investment positions related to market volatility. However, the strategies employed in attempting to hedge risk via the trading of interest rate swaptions do not necessarily lead to accurate profits and losses due to price dependency, i.e., the tendency to generate profits and losses that are affected by the path of price movements between trade inception and expiry dates rather than the absolute price level prevailing at the time of swaption expiry.

BRIEF SUMMARY

In order to provide an effective volatility index related to the interest rate swap market, and to provide exchange traded derivative products based on such an index, methods and systems for creating and disseminating a volatility index based on swaption information is disclosed. Particularly, the present disclosure sets forth systems and methods for creating an interest rate swap volatility index and trading derivative products based thereon.

According to one aspect, a computer-implemented method of calculating an interest rate swap volatility index is provided. The method includes, using a processor in a trading platform, calculating an interest rate swap volatility index associated with an underlying interest rate swaption. The processor then displays the interest rate swap volatility index associated with the underlying interest rate swaption on a trading platform display device coupled with the trading platform. Calculating the interest rate swap volatility index may include the processor aggregating prices of both at-the-money and out-of-the-money receiver and payer interest rate swaptions, for example in a single equation that is independent of any option pricing model. The method may reduce a relationship between an implied volatility of the underlying interest rate swaption and a strike of the underlying interest rate swaption into a single point for each maturity-tenor combination of the underlying interest rate swaption.

According to another aspect, a trading platform is disclosed. The trading platform may include a display device and a memory storing a set of instructions for calculating an interest rate swap volatility index associated with an underlying interest rate swaption. The trading platform may further include a processor in communication with the display device and the memory, where the processor is configured to execute the set of instructions stored in the memory to calculate the interest rate swap volatility index associated with the underlying interest rate swaption, and to display the interest rate swap volatility index associated with the underlying interest rate swaption on the display device.

DETAILED DESCRIPTION OF THE PREFERRED EMBODIMENTS

The embodiments of the present invention can be implemented on existing financial exchange systems and/or other known financial industry systems. Both financial exchange systems and other known financial industry systems utilize a combination of computer hardware (e.g., client and server computers, which may include computer processors, memory, storage, input and output devices, and other known components of computer systems; electronic communication equipment, such as electronic communication lines, routers, switches, etc; electronic information storage systems, such as network-attached storage and storage area networks) and computer software (i.e., the instructions that cause the computer hardware to function in a specific way) to achieve the desired system performance. It should be noted that financial exchange systems may be floor-based open outcry systems, pure electronic systems, or some combination of floor-based open outcry and pure electronic systems.

FIG. 1 illustrates an electronic trading system 100 which may be used for creating and disseminating a swaption index (such as an interest rate swap volatility index) and/or creating, listing and trading derivative contracts that are based on a swaption index. One having ordinary skill in the art would readily understand that system 100, as described in detail below, would be implemented utilizing a combination of computer hardware and software, as described in the paragraph above. It will be appreciated that the described systems may implement the methods described below.

The system 100 includes components operated by an exchange, as well as components operated by others who access the exchange to execute trades. The components shown within the dashed lines are those operated by the exchange. Components outside the dashed lines are operated by others, but nonetheless are necessary for the operation of a functioning exchange. The exchange components 122 of the trading system 100 include an electronic trading platform 120, a member interface 108, a matching engine 110, and backend systems 112. Backend systems not operated by the exchange but which are integral to processing trades and settling contracts are the Clearing Corporation's systems 114, and Member Firms' backend systems 116.

Market Makers may access the trading platform 120 directly through personal input devices 104 which communicate with the member interface 108. Market makers may quote prices for the derivative contracts of the present invention, e.g., interest rate swap volatility index derivative contracts. Non-member Customers 102, however, must access the exchange through a Member Firm. Customer orders are routed through Member Firm routing systems 106. The Member Firm routing systems 106 forward the orders to the exchange via the member interface 108. The member interface 108 manages all communications between the Member Firm routing systems 106 and Market Makers' personal input devices 104; determines whether orders may be processed by the trading platform; and determines the appropriate matching engine for processing the orders. Although only a single matching engine 110 is shown in system 100, the trading platform 120 may include multiple matching engines. Different exchange traded products may be allocated to different matching engines for efficient execution of trades. When the member interface 102 receives an order from a Member Firm routing system 106, the member interface 108 determines the proper matching engine 110 for processing the order and forwards the order to the appropriate matching engine. The matching engine 110 executes trades by pairing corresponding marketable buy/sell orders. Non-marketable orders are placed in an electronic order book.

Once orders are executed, the matching engine 110 sends details of the executed transactions to the exchange backend systems 112, to the Clearing Corporation systems 114, and to the Member Firm backend systems 116. The matching engine also updates the order book to reflect changes in the market based on the executed transactions. Orders that previously were not marketable may become marketable due to changes in the market. If so, the matching engine 110 executes these orders as well.

The exchange backend systems 112 perform a number of different functions. For example, contract definition and listing data originate with the Exchange backend systems 112. The swaption indices of the present invention, e.g., the interest rate swap volatility indices described below, and pricing information for derivative contracts associated with the indices of the present invention are disseminated from the exchange backend systems to market data vendors 118. Customers 102, market makers 104, and others may access the market data regarding the indices of the present invention and the derivative contracts based on the indices of the present invention via, for example, proprietary networks, on-line services, and the like.

The exchange backend systems also evaluate the underlying asset or assets on which the derivative contracts of the present invention are based. At expiration, the backend systems 112 determine the appropriate settlement amounts and supply final settlement data to the Clearing Corporation 114. The Clearing Corporation 114 acts as the exchange's bank and performs a final mark-to-market on Member Firm margin accounts based on the positions taken by the Member Firms' customers. The final mark-to-market reflects the final settlement amounts for the derivative contracts of the present invention, and the Clearing Corporation debits/credits Member Firms' accounts accordingly. These data are also forwarded to the Member Firms' systems 116 so that they may update their customer accounts as well.

Figure 2:
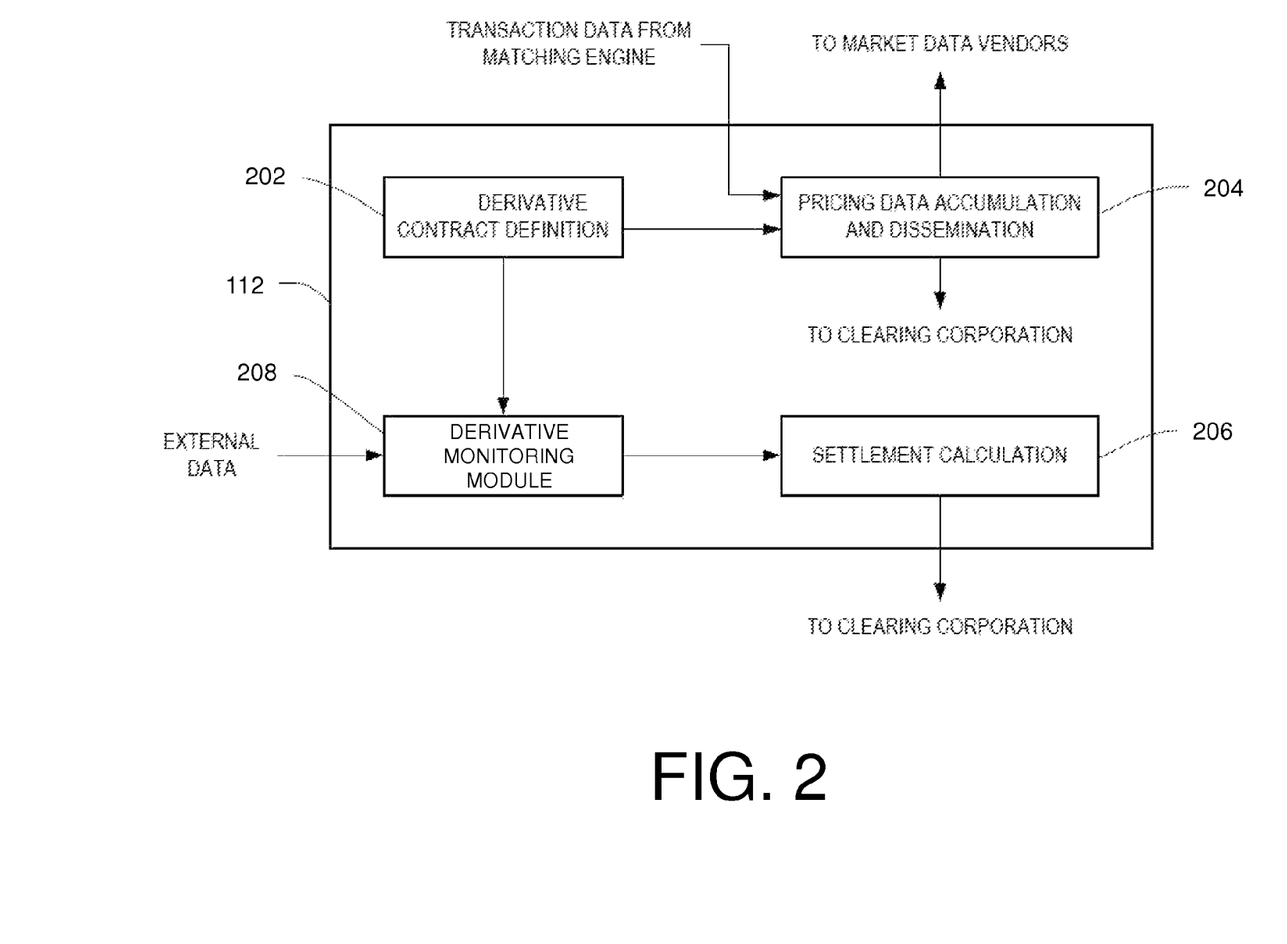
FIG. 2 is a diagram of a financial exchange's back end trading system.

FIG. 2 shows an embodiment of the exchange backend systems 112 used for creating and disseminating an index of the present invention, e.g., an interest rate swap volatility index, and/or creating, listing, and trading derivative contracts that are based on an index of the present invention. A derivative contract of the present invention has a definition stored in module 202 that contains all relevant data concerning the derivative contract to be traded on the trading platform 120, including, for example, the contract symbol, a definition of the underlying asset or assets associated with the derivative, or a term of a calculation period associated with the derivative. A pricing data accumulation and dissemination module 204 receives contract information from the derivative contract definition module 202 and transaction data from the matching engine 110. The pricing data accumulation and dissemination module 204 provides the market data regarding open bids and offers and recent transactions to the market data vendors 118. The pricing data accumulation and dissemination module 204 also forwards transaction data to the Clearing Corporation 114 so that the Clearing Corporation 114 may mark-to-market the accounts of Member Firms at the close of each trading day, taking into account current market prices for the derivative contracts of the present invention. Finally, a settlement calculation module 206 receives input from the derivative monitoring module 208. On the settlement date the settlement calculation module 206 calculates the settlement amount based on the value associated with the underlying asset or assets, e.g., the value of an interest rate swap volatility index. The settlement calculation module 206 forwards the settlement amount to the Clearing Corporation 114, which performs a final mark-to-market on the Member Firms' accounts to settle the derivative contract of the present invention.

Figure 5:
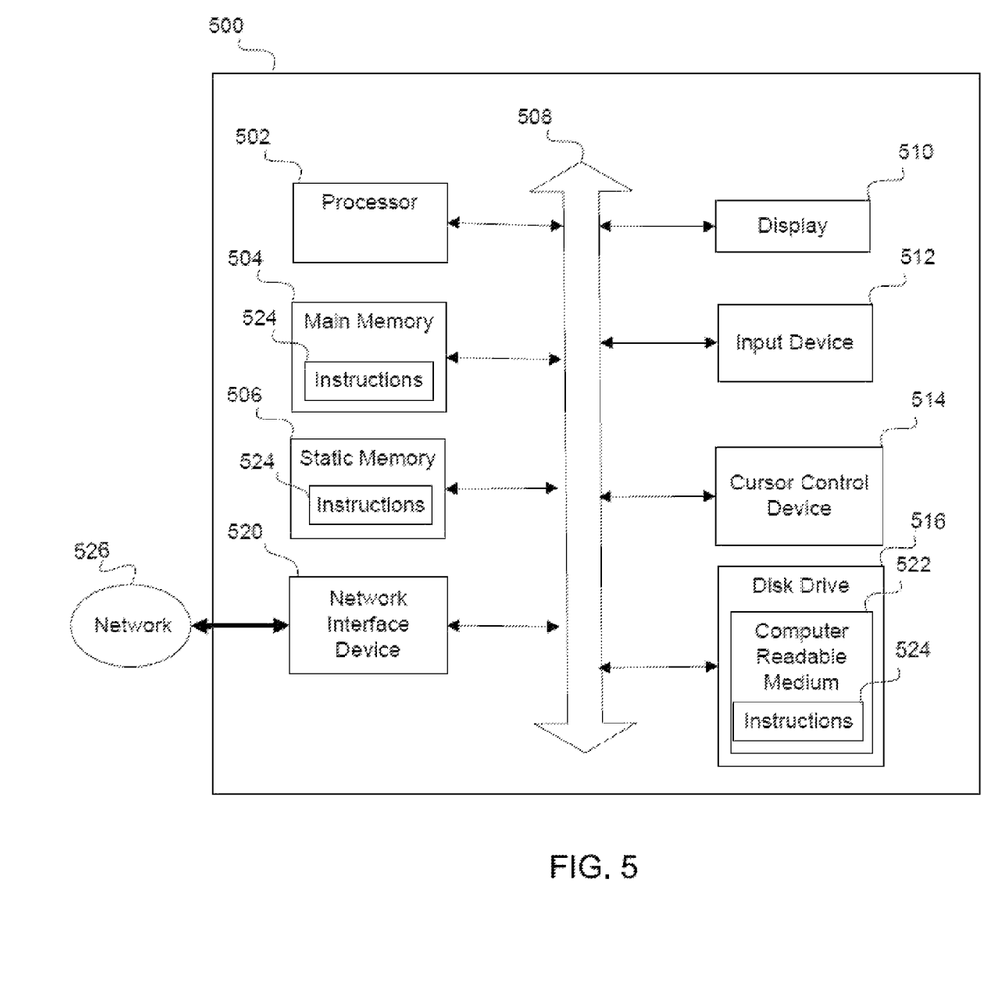
FIG. 5 is a diagram of a general purpose computer system that can be modified via computer hardware or software to be customized and specialized so as to be suitable for use in a financial exchanges computerized trading system.

Referring to FIG. 5, an illustrative embodiment of a general computer system that may be used for one or more of the components shown in FIG. 1, or in any other trading system configured to carry out the methods discussed in further detail below, is shown and is designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 500 can also be implemented as or incorporated into various devices, such as a personal computer ("PC"), a tablet PC, a set-top box ("STB"), a personal digital assistant ("PDA"), a mobile device, a palmtop computer, a laptop computer, a desktop computer, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, such as a central processing unit ("CPU"), a graphics processing unit ("GPU"), or both. Moreover, the computer system 500 can include a main memory 504 and a static memory 506 that can communicate with each other via a bus 508. As shown, the computer system 500 may further include a video display unit 510, such as a liquid crystal display ("LCD"), an organic light emitting diode ("OLED"), a flat panel display, a solid state display, or a cathode ray tube ("CRT"). Additionally, the computer system 500 may include an input device 512, such as a keyboard, and a cursor control device 514, such as a mouse. The computer system 500 can also include a disk drive unit 516, a signal generation device 518, such as a speaker or remote control, and a network interface device 520.

In a particular embodiment, as depicted in FIG. 5, the disk drive unit 516 may include a computer-readable medium 522 in which one or more sets of instructions 524, e.g., software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 524 or receives and executes instructions 524 responsive to a propagated signal, so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture information communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols commonly used by investment management companies, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

According to one embodiment, systems and methods are provided for calculating and disseminating swaption volatility indices. IRS volatility indices ("IRS-VI") may be calculated and disseminated using the systems shown in FIGS. 1, 2, and 5 and described in detail above. Generally, the IRS-VIs reflect the fair value of contracts for delivery of volatility of a forward swap rate of arbitrary tenor, and estimate the expected volatility of forward swap rates within arbitrary investment horizons. According to embodiments of the present invention, IRS-VIs can be calculated for interest rates in all currencies for which a swaption market exists. According to an embodiment of the present invention, the IRS-VI is calculated based on data relating to a liquid swaption market. For example, while IRS-Vis could be calculated in any currency, the indices would be particularly well suited for markets that operate in the following currencies: USD, EUR, GBP, CHF, and JPY.

According to one embodiment of the present invention, the IRS-VIs are calculated, for each maturity-tenor combination on the "volatility surface," by aggregating the price of at-the-money and out of-the money receiver and payer interest rate swaptions (i.e., the swaption "skew," the "volatility skew") into a single formula, which is independent of any option pricing model. These IRS-VIs match the prevailing market practices to quote swaptions, for example to quote in terms of either basis point volatility or percentage volatility. Moreover, the IRS-VIs described herein can reflect the fair market value of contracts for future delivery of IRS volatility, at each point of the volatility surface, i.e., over any arbitrary maturity date and tenor of the forward swap rate.

According to an embodiment of the present invention, the IRS-VIs are constructed using the prices of a broad set of interest rate swaptions, including both at-the-money and out-of-the money swaptions. Thus, according to an embodiment of the present invention, the IRS-VIs reduce the dimensions of the "volatility cube" in the interest rate swaption markets from three down to two, where a three dimensional relationship structure is reduced down to a two dimensional relationship structure. The "volatility cube" represents the relationship between the implied volatility of interest rate swaptions and: (i) time to expiration of the interest rate swaption, (ii) the length of the tenor period of the swap underlying the interest rate swaption, and (iii) the strike of the interest rate swaption. It is the dimension of the "volatility cube" that represents the relationship between the implied volatility of interest rate swaptions and the strike of the interest rate swaptions that is reduced by collapsing this dimension (iii) into a single point for each maturity-tenor combination.

Uncertainties relating to swaptions relate to both the difference between the future swap rate and the fixed strike at maturity and the price value of a basis point at maturity. Mathematically, the value of an interest rate swap payer at maturity at time T is, $$[R_T(T_1, \ldots, T_n) - K] \times PVBP_T(T_1, \ldots, T_n) \tag{1}$$

where $T_n - T$ is a swap's tenor; $T_1 - T, \ldots, T_n - T_{n-1}$ are the reset intervals of the swap contract over its tenor; $R_t(T_1, \ldots, T_n)$ is the forward swap rate at time t; K is the fixed interest of the swap; and $PVBP_T(T_1, \ldots, T_n)$ is the swap's "price value of a basis point." According to one embodiment of the present invention $PVBP_T(T1, \ldots, Tn)$ can be calculated according to the following mathematical formula:

$$PVBP_T(T_1, \ldots, T_n) \equiv \sum_{i=1}^{n} \delta_{i-1} P_t(T_i)$$

where $P_t(T_i)$ denotes the price as of time t of a pure discount bond maturing at some future date $T_i$, and $\delta_i \equiv T_{i+1} - T_i$. $PVBP_T(T_1, \ldots, T_n)$ is the impact of a one basis point change in a swap rate on the value of a fixed leg of the interest rate swap.

According to an embodiment of the present invention, an IRS-VI may be calculated, by the computerized financial exchange systems described above, as the fair value of a contract for volatility delivery, using data related to prices in swaption markets. According to an embodiment of the present invention, such a contract for volatility delivery may be defined by the following parameters: whereby at time t, a counterparty promises to pay the following payoff to a second counterparty at time T>t:

$$p_n(t,T) \equiv [V_n(t,T) - VS_n(t,T)] \times PVBP_T(T_1, \ldots, T_n) \quad (2)$$

where $VS_n(t,T)$ is a fixed variance swap rate determined at t, and is set so as to make the time t value of this contract equal to zero; $V_n(t,T)$ is the realized IRS volatility over the horizon T-t; and $PVBP_T(T1, \ldots, Tn)$, is as defined above.

According to an embodiment of the present invention, a forward variance agreement may be defined by the following parameters: whereby at time t, a counterparty promises to pay the following payoff to a second counterparty at time T>t.

$$p_n^f(t,T) \equiv V_n(t,T) \times PVBP_T(T_1, \ldots, T_n) \quad (3)$$

The payoff $p_n(t,T)$ in equation (2) is similar to that utilized for equity volatility contracts: the holder of the contract would receive $PVBP_T(T_1, \ldots, T_n)$ dollars for every point by which the realized variance, $V_n(t,T)$, exceeds the variance strike price, $VS_n(t,T)$. $PVBP_T(T_1, \ldots, T_n)$, is unknown at time t. Rescaling the rate volatility payoff by it, as done in Eq. (2), is mathematically unavoidable, when the objective is to price IRS volatility in a way independent of any option pricing model. Mathematically, to price volatility in IRS markets, simultaneously with other fixed income instruments such as swaps, swaptions and pure discount bonds, the payoff of the variance contract in equation (2) needs to be rescaled by $PVBP_T(T_1, \ldots, T_n)$, just as the value of the swap does in equation (1).

According to two embodiments of the present invention, $V_n(t,T)$ can be calculated using two different algorithms, which give rise to two different and distinct sets of contracts and indices, which match two distinct strands of market practice to quote interest rate swaptions. A first strand is based on quoting swaptions in terms of basis point implied volatilities (which are percentage implied volatilities for Black's formula (Black, Fisher, "The Pricing of Commodity Contracts," Journal of Financial Economics 3, 167-179 (1976), multiplied by the current forward swap rate). A second strand is based on swaptions quoted in terms of percentage implied volatilities.

According to one embodiment of the present invention, a basis point IRS-VI, as mathematically defined in equation (6) below, aggregates information of basis point implied volatilities by tracking expected volatility in a risk-adjusted market cast in basis point terms. In an embodiment of the present invention, the formula used to calculate IRS realized volatility gives rise to the so called "basis point" or "Gaussian" realized variance, where:

$$V_n(t,T) \equiv \int_t^T R_s^2(T_1, \ldots, T_n) \|\sigma_s(T_1, \ldots, T_n)\|^2 ds \quad (4)$$

where $R_s(T_1, \ldots, T_n)$ is the forward swap rate at time s with fixed payments on $T_1, \ldots, T_n$ which is a diffusion process with stochastic volatility and its arithmetic changes can be expressed as $$dR_s(T_1, \ldots, T_n) = R_s(T_1, \ldots, T_n)\sigma_s(T_1, \ldots, T_n)dW^*_s,$$
$$s \in [t,T]$$

where $\sigma_s(T_1, \ldots, T_n)$ is adapted to $W^*_s$, which is a multidimensional Brownian motion under the swap probability measure defined by $$\left.\frac{dQ_{swap}}{dQ}\right|_{F_T} = \exp\left(-\int_t^T r_s ds\right) \frac{PVBP_T(T_1, \ldots, T_n)}{PVBP_t(T_1, \ldots, T_n)}$$

where Q is the risk neutral probability measure, $F_T$ is the information set at time T, and $r_s$ is the instantaneous interest rate at time s.

Given this definition, the fair value of $VS_n(t,T)$ in equation 2 equals:

$$VS_n(t,T) = (T-t) \times [IRS\text{-}VI_n^{BP}(t,T)]^2 \quad (5)$$

where $IRS\text{-}VI_n^{BP}(t,T)$ is an interest rate swap volatility index according to one embodiment of the present invention. This embodiment of the present invention may be referred to as a Basis Point IRS-VI or BPIRS-VI. This index is calculated according to the following mathematical formula:

$$IRS\text{-}VI_n^{BP}(t,T) \equiv \quad (6)$$

$$\sqrt{\frac{2}{T-t}\frac{2}{PVBP_t(T_1, \ldots, T_n)}\left[\sum_{i:K_i<R_t} SWPN_t^R(K_i, T; T_n)\Delta K_i + \sum_{i:K_i \geq R_t} SWPN_t^P(K_i, T; T_n)\Delta K_i\right]}$$

where $SWPN_t^R(K_i,T;T_n)$ (resp., $SWPA_t^P(K_i,T;T_n)$) is the price of a swaption receiver (resp., payer), struck at $K_i$, expiring at T and with tenor extending up to time $T_n$, and $\Delta K_i = \frac{1}{2}(K_{i+1} - K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time $T_n$.

Pricing volatility in swap markets, in a way independent of any option pricing model, entails a contract design where two components need to be simultaneously taken into account: one, related to the realized variance of the forward swap rate, and a second, related to the forward PVBP, as the payoff in equation (1) indicates.

According to an embodiment of the present invention, an algorithm to compute the IRS variance Vn(t,T), alternative to Eq. (4), relies on the "log" or "percentage" realized variance:

$$V_n(t,T) \equiv \int_t^T \|\sigma_s(T_1, \ldots, T_n)\|^2 ds \quad (7)$$

where the log changes of the forward swap rate at time s with fixed payments on $T_1, \ldots, T_n$, $R_s(T_1, \ldots, T_n)$, which is a diffusion process with stochastic volatility, can be expressed as $$d\ln R_s(T_1, \ldots, T_n) =$$
$$-\frac{1}{2}\|\sigma_s(T_1, \ldots, T_n)\|^2 ds + \sigma_s(T_1, \ldots, T_n) \cdot dW^*_s, \quad s \in [t, T]$$

where $\sigma_s(T_1, \ldots, T_n)$ is adapted to $W^*_s$, which is a multidimensional Brownian motion under the swap probability measure defined by $$\left.\frac{dQ_{swap}}{dQ}\right|_{F_T} = \exp\left(-\int_t^T r_s ds\right) \frac{PVBP_T(T_1, \ldots, T_n)}{PVBP_t(T_1, \ldots, T_n)}$$

where Q is the risk neutral probability measure, $F_T$ is the information set at time T, and $r_s$ is the instantaneous interest rate at time s.

The fair value of $VS_n(t,T)$, relating to the contract delivering $p_n(t,T)$ in Eq. (2), equals:

$$VS_n(t,T) = (T-t) \times [IRS\text{-}VI_n(t,T)]^2 \qquad (8)$$

and the fair value for delivery of $p_n^f(t,T)$ in equation (3) is:

$$V\text{-}Fwd_n(t,T) \equiv PVBP_t(T_1, \ldots, T_n) \cdot VS_n(t,T) \qquad (9)$$

where $IRS\text{-}VI_n(t,T)$ is an embodiment of a value of an interest rate swap index according to the present invention. This embodiment of the present invention may be referred to as a percentage IRS-VI. According to an embodiment of the present invention, the Percentage IRS-VI may be calculated as follows:

$$IRS - VI_n(t, T) \equiv \qquad (10)$$

$$\sqrt{\frac{1}{T-t} \frac{2}{PVBP_t(T_1, \ldots, T_n)} \left[ \sum_{i: K_i < R} \frac{SWPN_t^R(K_i, T; T_n)}{K_i^2} \Delta K_i + \sum_{i: K_i \geq R} \frac{SWPN_t^P(K_i, T; T_n)}{K_i^2} \Delta K_i \right]}$$

where $SWPN_t^R(K_i, T; T_n)$ (resp., $SWPN_t^P(K_i, T; T_n)$) is the price of a swaption receiver (resp., payer), struck at $K_i$, expiring at T and with tenor extending up to time $T_n$, and $\Delta K_i = \frac{1}{2}(K_{i+1} - K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time $T_n$.

The difference between the Basis Point IRS-VI and the Percentage IRS-VI is that $IRS\text{-}VI_n(t,T)$, when calculated according to the Percentage IRS-VI, aggregates information conveyed by percentage implied volatilities from at/out-of-the money swaptions, not basis point volatilities.

According to another embodiment of the present invention, the Basis Point IRS-VI may be calculated as follows:

$$IRS - VI_n^{BP}(t, T) \equiv \qquad (11)$$

$$\sqrt{\frac{2}{T-t} \left[ \sum_{i: K_i < R} \frac{1}{PVBP_t(T_1, \ldots, T_n)} SWPN_t^R(K_i, T; T_n) \Delta K_i + \sum_{i: K_i \geq R} \frac{1}{PVBP_t(T_1, \ldots, T_n)} SWPN_t^P(K_i, T; T_n) \Delta K_i \right]}$$

where $SWPN_t^R(K_i, T; T_n)$ (resp., $SWPN_t^P(K_i, T; T_n)$) is the price of a swaption receiver (resp., payer), struck at $K_i$, expiring at T and with tenor extending up to time $T_n$, and $\Delta K_i = \frac{1}{2}(K_{i+1} - K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time $T_n$.

According to yet another embodiment of the present invention, the Percentage IRS-VI may be calculated as follows:

$$IRS - VI_n^{BP}(t, T) \equiv \sqrt{\frac{2}{T-t} \left[ \sum_{i: K_i < R} SWPN_t^R(K_i, T; T_n)' \Delta K_i + \sum_{i: K_i \geq R} SWPN_t^P(K_i, T; T_n)' \Delta K_i \right]} \qquad (12)$$

$SWPN_t^R(K_i, T; T_n)'$ (resp., $SWPN_t^P(K_i, T; T_n)'$) is equal to $$\frac{SWPN_t^R(K_i, T; T)}{PVBP_t(T_1, \ldots, T_n)}$$

(resp., $$\frac{SWPN_t^P(K_i, T; T_n)}{PVBP_t(T_1, \ldots, T_n)})$$

where $SWPN_t^R(K_i, T; T_n)$ (resp., $SWPN_t^P(K_i, T; T_n)$) is the price of a swaption receiver (resp., payer), struck at Ki, expiring at T and with tenor extending up to time $T_n$, and $\Delta K_i = \frac{1}{2}(K_{i+1} - K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time Tn. According to an embodiment of the present invention $SWPN_t^R(K_i, T; T_n)'$ and $SWPN_t^P(K_i, T; T_n)'$ can be calculated using quoted implied volatilities of the swaptions in Black's formula. In other embodiments, the basis point calculation method of equation (11) or the percentage calculation method of equation (12) may utilize a mix of both implied volatility data and price data, rather than only one of these types of data, as input data for calculating the interest rate swap volatility index.

According to another embodiment of the present invention, the Percentage IRS-VI may be calculated as follows:

$$IRS - VI_n(t, T) \equiv \qquad (13)$$

$$\sqrt{\frac{2}{T-t} \left[ \sum_{i: K_i < R} \frac{1}{PVBP_t(T_1, \ldots, T_n)} \frac{SWPN_t^R(K_i, T; T_n)}{K_i^2} \Delta K_i + \sum_{i: K_i \geq R} \frac{1}{PVBP_t(T_1, \ldots, T_n)} \frac{SWPN_t^P(K_i, T; T_n)}{K_i^2} \Delta K_i \right]}$$

where $SWPN_t^R(K_i, T; T_n)$ (resp., $SWPN_t^P(K_i, T; T_n)$) is the price of a swaption receiver (resp., payer), struck at $K_i$, expiring at T and with tenor extending up to time $T_n$, and $\Delta K_i = \frac{1}{2}(K_{i+1} - K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time $T_n$.

According to yet another embodiment of the present invention, the Percentage IRS-VI may be calculated as follows:

$$IRS-VI_n(t,T) \equiv \sqrt{\frac{2}{T-t}\left[\sum_{i:K_i<R}\frac{SWPN_t^R(K_i,T;T_n)'}{K_i^2}\Delta K_i + \sum_{i:K_i\geq R}\frac{SWPN_t^P(K_i,T;T_n)'}{K_i^2}\Delta K_i\right]} \quad (14)$$

where $SWPN_t^R(K_i,T;T_n)'$ (resp., $SWPN_t^P(K_i,T;T_n)'$) is equal to $$\frac{SWPN_t^R(K_i,T;T)}{PVBP_t(T_1,\ldots,T_n)}$$

(resp., $$\frac{SWPN_t^P(K_i,T;T_n)}{PVBP_t(T_1,\ldots,T_n)})$$

where $SWPN_t^R(K_i,T;T_n)$ (resp., $SWPN_t^P(K_i,T;T_n)$) is the price of a swaption receiver (resp., payer), struck at Ki, expiring at T and with tenor extending up to time $T_n$, and $\Delta K_i = \frac{1}{2}(K_{i+1}-K_{i-1})$ for $i \geq 1$, $\Delta K_0 = (K_1 - K_0)$, $\Delta K_M = (K_M - K_{M-1})$, where $K_0$ and $K_M$ are the lowest and the highest available strike prices traded in the market, and M+1 is the total number of traded swaptions expiring at time T and with tenor extending up to time Tn. According to an embodiment of the present invention $SWPN_t^R(K_i,T;T_n)'$ and $SWPN_t^P(K_i,T;T_n)'$ can be calculated using quoted implied volatilities of the swaptions in Black's formula. In other embodiments, the basis point calculation method of equation (13) or the percentage calculation method of equation (14) may utilize a mix of both implied volatility data and price data, rather than only one of these types of data, as input data for calculating the interest rate swap volatility index.

Figure 3:
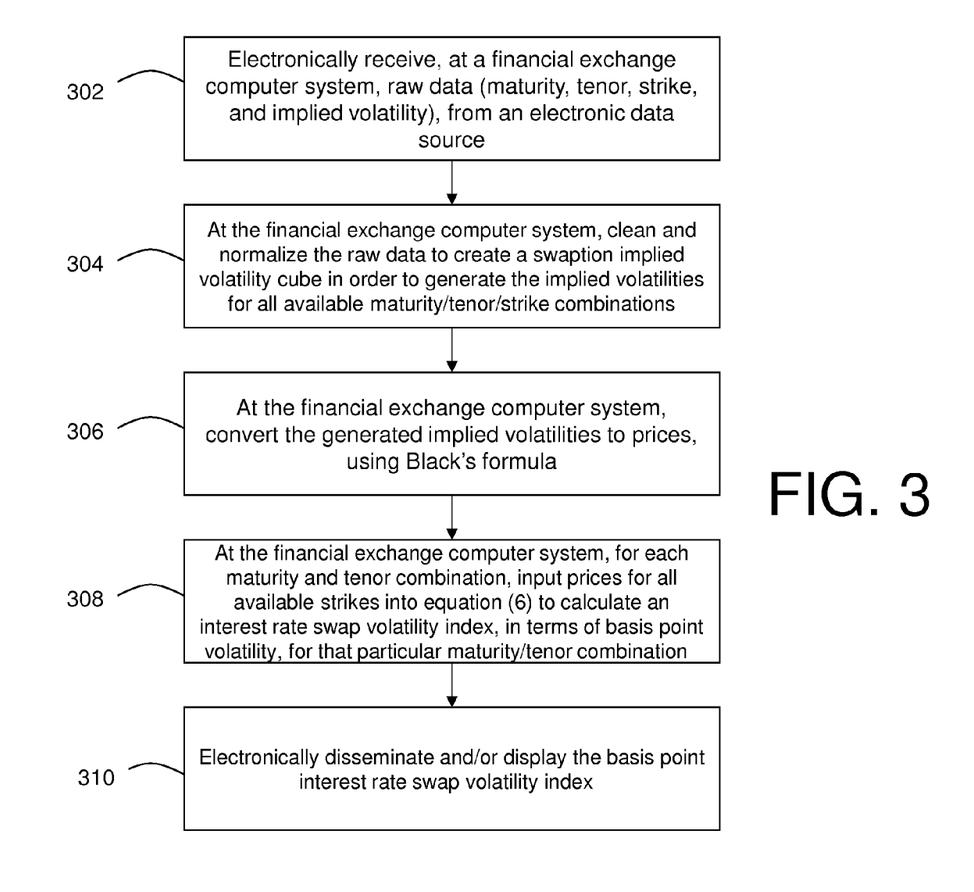
FIG. 3 is a flow diagram of a method of calculating a Basis Point IRS volatility index.

FIG. 3, is a flow diagram that outlines an embodiment of the steps for calculating and disseminating a basis point interest rate swap volatility index according to the present invention. At step 302, data is received electronically from an electronic data source. Included in the received data is data regarding the maturity, tenor, strike, and implied volatility of interest rate swaptions. At step 304, the data is cleaned and normalized, according to known techniques, and a swaption implied volatility cube is created in order to generate the implied volatilities for all available maturity/tenor/strike combinations. At step 306 the implied volatilities are converted to prices using Black's formula. At step 308, the prices for each maturity and tenor combination for all available strikes are inputted into equation (6), shown above, to calculate a basis point interest rate swap volatility index.

Figure 4:
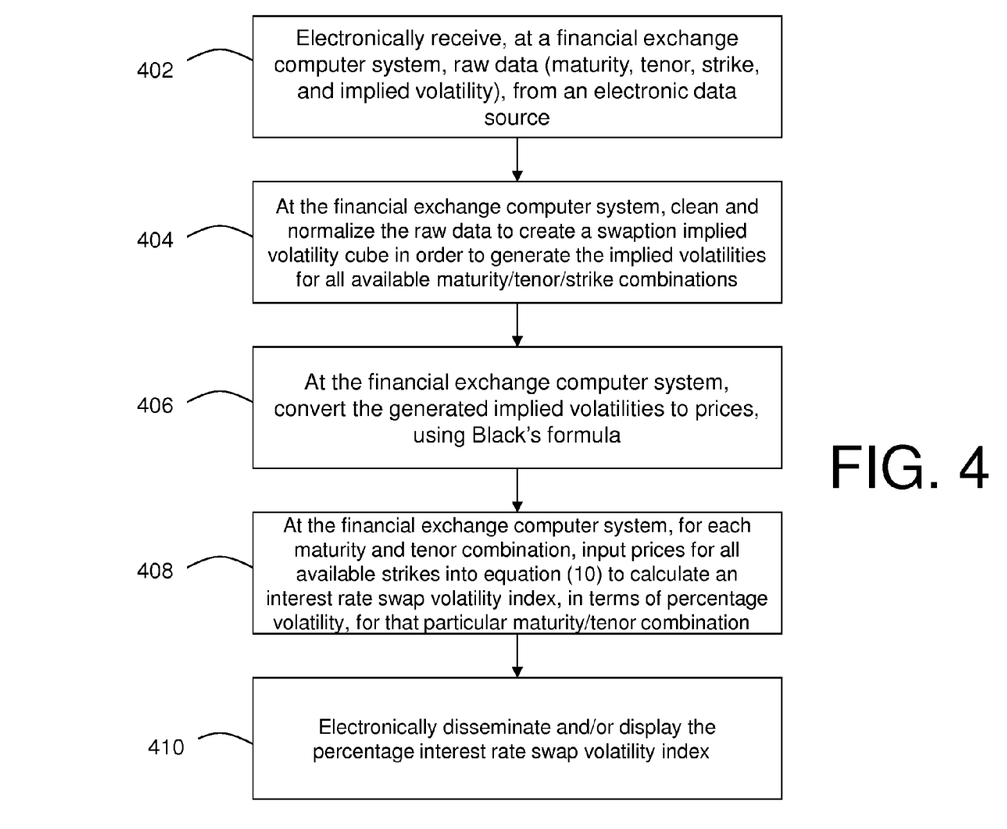
FIG. 4 is a flow diagram of a method of calculating a Percentage IRS volatility index.

FIG. 4, is a flow diagram that outlines an embodiment of the steps for calculating and disseminating a percentage interest rate swap volatility index according to the present invention. At step 402, data is received electronically from an electronic data source. Included in the received data is data regarding the maturity, tenor, strike, and implied volatility of interest rate swaptions. At step 404, the data is cleaned and normalized, according to known techniques, and a swaption implied volatility cube is created in order to generate the implied volatilities for all available maturity/tenor/strike combinations. At step 406 the implied volatilities are converted to prices using Black's formula. At step 408, the prices for each maturity and tenor combination for all available strikes are inputted into equation (10), shown above, to calculate a percentage interest rate swap volatility index.

The steps shown in FIGS. 3 and 4 can be performed using the systems illustrated in FIGS. 1, 2, and 5.

IMPLEMENTATION EXAMPLES

The following is a non-limiting example of how the methodologies of the present invention can be used to construct the Basis Point IRS-VI and the Percentage IRS-VI. As noted above the actual calculation and dissemination of the Basis Point IRS-VI and the Percentage IRS-VI are performed by the calculation and dissemination system, an example of which is illustrated in FIG. 3.

The present example, utilizes data reflecting market conditions on Feb. 12, 2010. The data provided are implied volatilities expressed in percentage terms, and relate to interest rate swaptions maturing in one month and tenor equal to five years. The data for this example is provided below in table 1:

TABLE 1

| Strike Rate (%) | Percentage Implied Vol | Basis Point Implied Vol | Black's prices Receiver Swaption ($\hat{Z}$) | Black's prices Payer Swaption Z |
|---|---|---|---|---|
| 1.7352 | 36.1900 | 98.9869 | ≈0 | $10.0000 \cdot 10^{-3}$ |
| 1.9852 | 36.1900 | 98.9869 | $0.0007 \cdot 10^{-3}$ | $7.5007 \cdot 10^{-3}$ |
| 2.2352 | 36.1200 | 98.7954 | $0.0259 \cdot 10^{-3}$ | $5.0259 \cdot 10^{-3}$ |
| 2.4352 | 35.9900 | 98.4398 | $0.1773 \cdot 10^{-3}$ | $3.1773 \cdot 10^{-3}$ |
| 2.5352 | 35.9300 | 98.2757 | $0.3692 \cdot 10^{-3}$ | $2.3692 \cdot 10^{-3}$ |
| 2.6352 | 35.8600 | 98.0843 | $0.6793 \cdot 10^{-3}$ | $1.6793 \cdot 10^{-3}$ |
| 2.6852 | 35.8300 | 98.0022 | $0.8855 \cdot 10^{-3}$ | $1.3855 \cdot 10^{-3}$ |
| 2.7352 | 35.8000 | 97.9202 | $1.1272 \cdot 10^{-3}$ | $1.1272 \cdot 10^{-3}$ |
| 2.7852 | 35.7600 | 97.8108 | $1.4037 \cdot 10^{-3}$ | $0.9037 \cdot 10^{-3}$ |
| 2.8352 | 35.7300 | 97.7287 | $1.7142 \cdot 10^{-3}$ | $0.7142 \cdot 10^{-3}$ |
| 2.9352 | 35.6700 | 97.5646 | $2.4270 \cdot 10^{-3}$ | $0.4270 \cdot 10^{-3}$ |
| 3.0352 | 35.6000 | 97.3731 | $3.2406 \cdot 10^{-3}$ | $0.2406 \cdot 10^{-3}$ |
| 3.2352 | 35.4700 | 97.0175 | $5.0644 \cdot 10^{-3}$ | $0.0644 \cdot 10^{-3}$ |
| 3.4852 | 35.3100 | 96.5799 | $7.5092 \cdot 10^{-3}$ | $0.0092 \cdot 10^{-3}$ |
| 3.7352 | 35.1400 | 96.1149 | $10.0010 \cdot 10^{-3}$ | $0.0010 \cdot 10^{-3}$ |

The first two columns of Table 1, as shown above, report strike rates, K, and percentage implied volatilities for each strike rate, IV(K). The third column provides basis point implied volatilities, $IV^{BP}(K)$, for each strike rate K, defined according to the following formula: $IV^{BP}(K)=IV(K)\cdot R$, where R denotes the current forward swap rate. According to other embodiments of the present invention, basis point volatilities are not needed to compute the indexes of the present invention, such as Basis Point IRS-VI and Percentage IRS-VI.

According to an embodiment of the present invention, the Basis Point IRS-VI and Percentage IRS-VI are calculated by first, plugging the "skew" IV(K) into the Black's formula, and then, replacing the Black's formula into the formulas shown above for calculating the Basis Point IRS-VI and Percentage IRS-VI, e.g., equations (6) and (10). Accordingly:

$$IRS-VI_n^{BP}(t,T) = \sqrt{\frac{2}{T-t}\left[\sum_{i:K_i<R}\hat{Z}(R,T,K_i;(T-t)IV^2(K_i))\Delta K_i + \sum_{i:K_i\geq R}Z(R,T,K_i;(T-t)IV^2(K_i))\Delta K_i\right]} \quad (15)$$

and $$IRS - VI_n(t, T) = \qquad (16)$$

$$\sqrt{\frac{2}{T-t}\left[\sum_{i:K_i<R}\frac{\hat{Z}(R, T, K_i; (T-t)IV^2(K_i))}{K_i^2}\Delta K_i + \sum_{i:K_i\geq R}\frac{Z(R, T, K_i; (T-t)IV^2(K_i))\Delta K_i}{K_i^2}\right]}$$

where $$\hat{Z}(R,T,K_i;(T-t)IV^2(K_i))=Z(R,T,K_i;(T-t)IV^2(K_i))+K-R \qquad (17)$$

$$Z(R, T, K; V) = R\Phi(d) - K\Phi(d - \sqrt{V}), \; d = \frac{\ln\frac{R}{K} + \frac{1}{2}V}{\sqrt{V}} \qquad (18)$$

and $\Phi$ denotes the cumulative standard normal distribution.

According to the present example, the percentage implied volatilities, IV(K), are utilized as data in equations 17 and 18, to obtain values for $\hat{Z}$ and $Z$. The fourth and fifth columns of Table 1, as shown above, provide interest rate swaption prices re-normalized by the PVBP, i.e., the values of $\hat{Z}$ and $Z$ (Black's prices), for each strike rate.

Table 2, as shown below, provides information regarding the present examples calculation of the Basis Point IRS-VI and Percentage IRS-VI, according to equations 15 and 16 respectively.

$$\frac{2}{T-t};$$

and finally, the sixth and seventh columns report each out-of-the-money interest rate swaption price corrected by the appropriate weight. Each price in the third column is multiplied by the corresponding weight in the fourth column, for the "Basis Point Contribution," and each price in the third column is multiplied by the corresponding weight in the fifth column, for the "Percentage Contribution."

Thus, according to the data provided in this example, embodiments of the Basis Point IRS-VI and Percentage IRS-VI are calculated, respectively, as follows:

$$IRS - VI^{BP} = 100^2 \times \sqrt{\frac{2}{12^{-1}} \times 4.1567 \cdot 10^{-6}} = 99.8803, \text{ and}$$

$$IRS - VI = 100 \times \sqrt{\frac{2}{12^{-1}} \times 5.5405 \cdot 10^{-3}} = 36.4653.$$

For purposes of comparison, the at-the-money implied basis point and percentage volatilities are $IV^{BP}(R)=97.9202$ and $IV(R)=35.8000$.

In this non-limiting example, the basis point index is rescaled by $100^2$, to mimic the market practice to express basis point implied volatility as the product of rates times log-volatility, where both rates and log-volatility are multiplied by 100.

According to embodiments of the present invention, indices calculated according to the embodiments of the present invention may serve as the underlying asset for derivative contracts, such as options and futures contracts. More particularly, according to an embodiment of the present invention, an IRS-VI may serve as the underlying reference for

TABLE 2

| | | | Weights | | Contributions to Strikes | |
| --- | --- | --- | --- | --- | --- | --- |
| Strike Rate (%) | Swaption Type | Price | Basis Point $\Delta K_i$ | Percentage $\Delta K_i/K_i^2$ | Basis Point Contribution | Percentage Contribution |
| 1.7352 | Receiver | ≈0 | 0.0025 | 8.3031 | ≈0 | ≈0 |
| 1.9852 | Receiver | $0.0007 \cdot 10^{-3}$ | 0.0025 | 6.3435 | $0.0018 \cdot 10^{-6}$ | $0.0046 \cdot 10^{-3}$ |
| 2.2352 | Receiver | $0.0259 \cdot 10^{-3}$ | 0.0022 | 4.5035 | $0.0583 \cdot 10^{-6}$ | $0.1167 \cdot 10^{-3}$ |
| 2.4352 | Receiver | $0.1773 \cdot 10^{-3}$ | 0.0015 | 2.5294 | $0.2660 \cdot 10^{-6}$ | $0.4485 \cdot 10^{-3}$ |
| 2.5352 | Receiver | $0.3692 \cdot 10^{-3}$ | 0.0010 | 1.5559 | $0.3692 \cdot 10^{-6}$ | $0.5744 \cdot 10^{-3}$ |
| 2.6352 | Receiver | $0.6793 \cdot 10^{-3}$ | 0.0008 | 1.0800 | $0.5095 \cdot 10^{-6}$ | $0.7337 \cdot 10^{-3}$ |
| 2.6852 | Receiver | $0.8855 \cdot 10^{-3}$ | 0.0005 | 0.6935 | $0.4428 \cdot 10^{-6}$ | $0.6141 \cdot 10^{-3}$ |
| 2.7352 | ATM | $1.1272 \cdot 10^{-3}$ | 0.0005 | 0.6683 | $0.5636 \cdot 10^{-6}$ | $0.7533 \cdot 10^{-3}$ |
| 2.7852 | Payer | $0.9037 \cdot 10^{-3}$ | 0.0005 | 0.6446 | $0.4518 \cdot 10^{-6}$ | $0.5825 \cdot 10^{-3}$ |
| 2.8352 | Payer | $0.7142 \cdot 10^{-3}$ | 0.0007 | 0.9330 | $0.5357 \cdot 10^{-6}$ | $0.6664 \cdot 10^{-3}$ |
| 2.9352 | Payer | $0.4270 \cdot 10^{-3}$ | 0.0010 | 1.1607 | $0.4270 \cdot 10^{-6}$ | $0.4956 \cdot 10^{-3}$ |
| 3.0352 | Payer | $0.2406 \cdot 10^{-3}$ | 0.0015 | 1.6282 | $0.3609 \cdot 10^{-6}$ | $0.3917 \cdot 10^{-3}$ |
| 3.2352 | Payer | $0.0644 \cdot 10^{-3}$ | 0.0023 | 2.1497 | $0.1448 \cdot 10^{-6}$ | $0.1384 \cdot 10^{-3}$ |
| 3.4852 | Payer | $0.0092 \cdot 10^{-3}$ | 0.0025 | 2.0582 | $0.0229 \cdot 10^{-6}$ | $0.0188 \cdot 10^{-3}$ |
| 3.7352 | Payer | $0.0010 \cdot 10^{-3}$ | 0.0025 | 1.7919 | $0.0024 \cdot 10^{-6}$ | $0.0017 \cdot 10^{-3}$ |
| | | | | SUMS | $4.1567 \cdot 10^{-6}$ | $5.5405 \cdot 10^{-3}$ |

The second column of Table 2 displays the type of out-of-the-money interest rate swaptions entering in the calculations of the embodiments of the IRS-VI. The third column money swaption entering into the calculation; the third column has the Black's price corresponding to the used interest rate swaption; the fourth and fifth columns report the weights each Black's price bears towards the final computation of the index, before the final rescaling of derivative contracts designed for trading the volatility of forward interest rate swap rates of various tenors. In particular, futures and options contracts with varying maturities based on the index may be traded OTC and/or listed on exchanges.

Derivative instruments based on the interest rate swaption volatility index disclosed above may be created as standardized, exchange-traded contracts, as opposed to over-the-counter contracts. Once the interest rate swaption volatility index (IRS-VI) based on interest rate swaptions is calculated, the index may be accessed for use in creating a derivative contract, and the derivative contract may be assigned a unique symbol. Generally, the IRS-VI derivative contract may be assigned any unique symbol that serves as a standard identifier for the type of standardized IRS-VI derivative contract. Information associated with the IRS-VI and/or the IRS-VI derivative contract may be transmitted for display, such as transmitting information to list the IRS-VI index and/or the IRS-VI derivative on a trading platform. Examples of the types of information that may be transmitted for display include a settlement price of an IRS-VI derivative, a bid or offer associated with an IRS-VI derivative, a value of an IRS-VI index, and/or a value of an underlying swaptions that an IRS-VI is associated with.

Generally, an IRS-VI derivative contract may be listed on an electronic platform, an open outcry platform, a hybrid environment that combines the electronic platform and open outcry platform, or any other type of platform known in the art. One example of a hybrid exchange environment is disclosed in U.S. Pat. No. 7,613,650, filed Apr. 24, 2003, the entirety of which is herein incorporated by reference. Additionally, a trading platform such as an exchange may transmit IRS-VI derivative contract quotes of liquidity providers over dissemination networks to other market participants. Liquidity providers may include Designated Primary Market Makers ("DPM"), market makers, locals, specialists, trading privilege holders, registered traders, members, or any other entity that may provide a trading platform with a quote for a variance derivative. Dissemination Networks may include networks such as the Options Price Reporting Authority ("OPRA"), the CBOE Futures Network, an Internet website or email alerts via email communication networks. Market participants may include liquidity providers, brokerage firms, normal investors, or any other entity that subscribes to a dissemination network.

The trading platform may execute buy and sell orders for the IRS-VI derivative and may repeat the steps of calculating the IRS-VI of the underlying swaptions, accessing the IRS-VI index, transmitting information for the IRS-VI index and/or the IRS-VI derivative for display (list the IRS-VI and/or IRS-VI derivative on a trading platform), disseminating the IRS-VI and/or the IRS-VI derivative over a dissemination network, and executing buy and sell orders for the IRS-VI derivative until the IRS-VI derivative contract is settled.

In some implementations, IRS-VI derivative contracts may be traded through an exchange-operated parimutuel auction and cash-settled based on the IRS-VI index of log returns of the underlying equity. An electronic parimutuel, or Dutch, auction system conducts periodic auctions, with all contracts that settle in-the-money funded by the premiums collected for those that settle out-of-the-money.

As mentioned, in a parimutuel auction, all the contracts that settle in-the-money are funded by those that settle out-of-the-money. Thus, the net exposure of the system is zero once the auction process is completed, and there is no accumulation of open interest over time. Additionally, the pricing of contracts in a parimutuel auction depends on relative demand; the more popular the strike, the greater its value. In other words, a parimutuel action does not depend on market makers to set a price; instead the price is continuously adjusted to reflect the stream of orders coming into the auction. Typically, as each order enters the system, it affects not only the price of the sought-after strike, but also affects all the other strikes available in that auction. In such a scenario, as the price rises for the more sought-after strikes, the system adjusts the prices downward for the less popular strikes. Further, the process does not require the matching of specific buy orders against specific sell orders, as in many traditional markets. Instead, all buy and sell orders enter a single pool of liquidity, and each order can provide liquidity for other orders at different strike prices and the liquidity is maintained such that system exposure remains zero. This format maximizes liquidity, a key feature when there is no tradable underlying instrument.

The following characteristics of futures contracts illustrate one embodiment of a futures contract having an index of the present invention as an underlying asset. The characteristics are not meant to limit the present invention, but rather to set forth common characteristics of futures.:

Contract Size: The notional amount of one unit of the contract may be defined as a multiple of the index level, which may depend on the currency of the underlying index. When traded OTC, the multiplier may be negotiated between the parties involved on a trade-by-trade basis.

Contract Months: An exchange may list contracts with a pre-determined sequence of maturity dates, e.g. the 3rd Friday of each of the next 6 months. Similarly, OTC dealers may make markets in a pre-determined sequence of maturity dates but may also make markets for contracts that mature on other dates on a trade-by-trade basis.

Quotation & Minimum Price Intervals: Futures based on the index may be quoted in points and decimals or fractions that represent some notional amount per contract and there may be a minimum increment by which the pricing of the contracts may vary, both of which may depend on the currency of the underlying index. The OTC market may adopt different conventions for quoting and minimum ticks.

Last Trading Date: For each contract, a last trading date will be specified.

Final Settlement Date: For each contract, a final settlement date will be specified.

Final Settlement Value: The final settlement value shall be based on the level of the index computed at a pre-specified time on the settlement date.

Delivery: Settlement of futures based on the index will take the form of a delivery of the cash settlement amount and a payment date will be specified in relation to the final settlement date.

Additional Specifications when Exchange Traded: When traded on an exchange, trading platform, margin requirements, trading hours, order crossing rules, block trading rules, reporting rules, and other details may be specified.

The following characteristics of options contracts illustrate one embodiment of an options contract having an index of the present invention as an underlying asset. The characteristics are not meant to limit the present invention, but rather to set forth common characteristics of options.:

Contract Size: The notional amount of one unit of the contract may be defined as a multiple of the index level, which may depend on the currency of the underlying index. When traded OTC, the multiplier may be negotiated between the parties involved on a trade-by-trade basis.

Contract Months: An exchange may list contracts with a pre-determined sequence of expiration dates, e.g. the 3rd Friday of each of the next 6 months. Similarly, OTC dealers may make markets in a pre-determined sequence of maturity dates but may also make markets for contracts that expire on other dates on a trade-by-trade basis.

Strike Prices: For each currency, strike prices that are in-, at-, and out-of the money may be listed by an exchange or quoted by OTC dealers and new strike prices may be traded as swap rates increase and decrease. An exchange or the OTC dealer community may fix a minimum increment between strike prices, depending on the currency of the underlying index.

Quotation & Minimum Price Intervals: Options based on the index may be quoted in points and decimals or fractions that represent some notional amount per contract and there may be a minimum increment by which the pricing of the contracts may vary, both of which may depend on the currency of the underlying index. The OTC Market may adopt different conventions for quoting and minimum ticks.

Exercise Style: Options written on the IRS-VI are likely to be, but not limited to, European style. It is envisioned that American style contracts could also have an index of the present invention as an underlying asset Expiration Date: For each contract, an expiration date will be specified.

Last Trading Date: For each contract, a last trading date will be specified.

Settlement of Exercise: The final settlement value shall be based on the level of the index computed at a pre-specified time on the settlement date. The cash settlement amount will be the difference between the index level and the strike price, possibly adjusted by some multiplier, and a payment date will be specified in relation to the expiration date.

Additional Specifications when Exchange Traded: When traded on an exchange, trading platform, margin requirements, trading hours, reporting rules, and other details may be specified.

According to other embodiments of the present invention, other financial products that track or reference the indices of the present invention may be created. Such products include, but are not limited to, Exchange Traded Funds and Exchange Traded Notes listed on exchanges and structured products sold by financial institutions.

Interest rate swap volatility indexes and derivative instruments based there on have been disclosed. An advantage of derivatives based on the interest rate swap volatility indexes disclosed herein is the ability to provide a hedge against options or other derivatives that are subject to interest rate swap volatility risk. It is intended that the foregoing detailed description be regarded as illustrative rather than limiting, and that it be understood that it is the following claims, including all equivalents, that are intended to define the spirit and scope of this invention.

The invention claimed is:

1. A computer-implemented method of calculating an interest rate swap volatility index reflecting a measure of expected future interest rate swap volatility, the method comprising:
with a processor in a trading platform:
calculating with the processor the interest rate swap volatility index, where the interest rate swap volatility index is a swaption-implied measure of expected future interest rate swap volatility associated with at least one underlying interest rate swaption;
wherein calculating the interest rate swap volatility index comprises the processor aggregating prices of at-the-money and out-of-the-money receiver and payer interest rate swaptions and the interest rate swap volatility index at time t is calculated according to an equation:

$$IRS-VI_n^{BP}(t,T) \equiv$$

$$\sqrt{\frac{1}{T-t}\frac{2}{PVBP_t(T_1,\ldots,T_n)}\left[\sum_{i:K_i<R_t}SWPN_t^R(K_i,T;T_n)\Delta K_i + \sum_{i:K_i\geq R_t}SWPN_t^P(K_i,T;T_n)\Delta K_i\right]}$$

where $SWPN_t^R(K_i,T;T_n)$ (resp., $SWPN_t^P(K_i,T;T_n)$) is a price of a swaption receiver (resp., payer), struck at $K_i$, expiring at T and with tenor extending up to time $T_n$, and $\Delta K_i = \frac{1}{2}(K_{i+1}-K_{i-1})$ for $i \geq 1$, $\Delta K_0 = (K_1-K_0)$, $\Delta K_M = (K_M-K_{M-1})$, where $K_0$ and $K_M$ are lowest and highest available strike prices traded in a market, and M+1 is a total number of traded swaptions expiring at time T and with tenor extending up to time $T_n$, where $PVBP_t(T_1,\ldots,T_n)$ is a price value of a basis point at time t of an interest rate swap starting at time T with fixed payment dates $T_1,\ldots,T_n$, and which is an impact of a one basis point change in a swap rate on a value of a fixed leg of the interest rate swap, and where $R_t$ is the forward swap rate prevailing at time t; and
displaying the interest rate swap volatility index associated with the underlying interest rate swaptions on a trading platform display device coupled with the trading platform.

2. The method of claim 1, wherein calculating the interest rate swap volatility index comprises the processor receiving payer and receiver swaption data as implied volatilities and converting the implied volatilities into prices using Black's formula.

3. The method of claim 1, further comprising:
transmitting the interest rate swap volatility index over at least one electronic dissemination network.

4. The method of claim 1, further comprising the processor:
creating a standardized exchange-traded derivative instrument based on the interest rate swap volatility index;
transmitting information for display associated with the standardized exchange traded derivative instrument, the information comprising a settlement price of the derivative instrument.

5. The method of claim 4, wherein transmitting information associated with the derivative instrument based on the interest rate swap volatility index comprises transmitting a settlement price of the derivative instrument.

6. The method of claim 4, wherein transmitting information associated with the derivative instrument based on the interest rate swap volatility index comprises transmitting a bid associated the derivative instrument.

7. The method of claim 4, wherein transmitting information associated with the derivative instrument based on the interest rate swap volatility index comprises transmitting an offer associated the derivative instrument.

8. A trading platform comprising:
a display device;
a memory storing a set of instructions for calculating an interest rate swap volatility index associated with an underlying interest rate swaption the interest rate swap volatility index reflecting a measure of expected future interest rate swap volatility; and
a processor in communication with the display device and the memory, the processor configured to execute the set of instructions stored in the memory and to:
calculate the interest rate swap volatility index associated with the underlying interest rate swaption;

wherein the processor is configured to calculate the interest rate swap volatility index by aggregating prices of at-the-money and out-of-the-money receiver and payer interest rate swaptions according to the equation:

$$IRS-VI_n^{BP}(t,T) \equiv \sqrt{\frac{1}{T-t} \frac{2}{PVBP_t(T_1,\ldots,T_n)} \left[ \sum_{i:K_i<R_t} SWPN_t^R(K_i,T;T_n)\Delta K_i + \sum_{i:K_i\geq R_t} SWPN_t^P(K_i,T;T_n)\Delta K_i \right]}$$

where $SWPN_t^R(K_i,T;T_n)$ (resp., $SWPN_t^P(K_i,T;T_n)$) is a price of a swaption receiver (resp., payer), struck at $K_i$, expiring at T and with tenor extending up to time $T_n$, and $\Delta K_i = \frac{1}{2}(K_{i+1}-K_{i-1})$ for $i \geq 1$, $\Delta K_0 = (K_1-K_0)$, $\Delta K_M = (K_M - K_{M-1})$, where $K_0$ and $K_M$ are lowest and highest available strike prices traded in a market, and M+1 is a total number of traded swaptions expiring at time T and with tenor extending up to time $T_n$, where $PVBP_t(T_1,\ldots,T_n)$ is a price value of a basis point at time t of an interest rate swap starting at time T with fixed payment dates $T_1,\ldots,T_n$, and which is an impact of a one basis point change in a swap rate on a value of a fixed leg of the interest rate swap, and where $R_t$ is the forward swap rate prevailing at time t; and display the interest rate swap volatility index associated with the underlying interest rate swaptions on the display device.

9. The trading platform of claim 8, wherein the processor is configured to calculate the interest rate swap volatility index by receiving payer and receiver swaption data as implied volatilities and converting the implied volatilities into prices using Black's formula.

10. The trading platform of claim 8, wherein the processor is further configured to transmit the interest rate swap volatility index over at least one electronic dissemination network.

11. The trading platform of claim 8, wherein the trading platform is an exchange.

12. The trading platform of claim 8, wherein the processor is further configured to create a standardized exchange-traded derivative instrument based on the interest rate swap volatility index; and transmit information for display associated with the standardized exchange traded derivative instrument.

\* \* \* \* \*